United States Patent
Tennant et al.

(10) Patent No.: US 10,614,607 B2
(45) Date of Patent: Apr. 7, 2020

(54) PLAYBACK OF HANDWRITTEN MESSAGE

(71) Applicant: Apple Inc., Cupertino, CA (US)

(72) Inventors: Brandon M. Tennant, Sunnyvale, CA (US); Conrad R. Carlen, Burlingame, CA (US); Bradley Griffin, Berkeley, CA (US)

(73) Assignee: APPLE INC., Cupertino, CA (US)

( * ) Notice: Subject to any disclaimer, the term of this patent is extended or adjusted under 35 U.S.C. 154(b) by 273 days.

(21) Appl. No.: 15/409,414

(22) Filed: Jan. 18, 2017

(65) Prior Publication Data

US 2017/0358114 A1 Dec. 14, 2017

Related U.S. Application Data

(60) Provisional application No. 62/349,116, filed on Jun. 12, 2016.

(51) Int. Cl.
| | |
|---|---|
| *G06T 13/80* | (2011.01) |
| *G06T 11/60* | (2006.01) |
| *G06K 9/00* | (2006.01) |
| *H04W 4/14* | (2009.01) |
| *G06F 3/0488* | (2013.01) |
| *G06F 3/0487* | (2013.01) |

(52) U.S. Cl.
CPC .......... *G06T 13/80* (2013.01); *G06K 9/00416* (2013.01); *G06T 11/60* (2013.01); *H04W 4/14* (2013.01); *G06F 3/0487* (2013.01); *G06F 3/04883* (2013.01)

(58) Field of Classification Search
CPC ..... G06T 13/80; G06T 11/60; G06K 9/00416; H04W 4/14
See application file for complete search history.

(56) References Cited

U.S. PATENT DOCUMENTS

| | | | |
|---|---|---|---|
| 5,426,726 A | * | 6/1995 | Horiuchi .............. G06T 11/203 345/467 |
| 5,768,607 A | | 6/1998 | Drews et al. |
| 5,838,313 A | | 11/1998 | Hou et al. |
| 6,057,833 A | | 5/2000 | Heidmann et al. |
| 7,516,183 B2 | | 4/2009 | Shiigi |

(Continued)

FOREIGN PATENT DOCUMENTS

WO WO 2009/145767 A1 12/2009

OTHER PUBLICATIONS

Vivencio C. Fuentes Jr., Rowell O. Atienza, "Smooth Writing Card for a Messaging App", 2014 Seventh International Workshop on Selected Topics in Mobile and Wireless Computing, 2014 IEEE., pp. 341-347.

(Continued)

*Primary Examiner* — Justin R. Blaufeld
(74) *Attorney, Agent, or Firm* — Morgan, Lewis & Bockius LLP

(57) ABSTRACT

A system for processing a handwritten message received by a messaging app can modify playback over time of the handwritten message based on a set of rules to determine how to modify the playback. In one embodiment, graphics data (e.g. vector graphics data) that represents the handwritten message is processed using the rules to determine how to modify the playback such that the resulting playback includes at least one modification over a portion of time of the playback.

18 Claims, 17 Drawing Sheets

(56) References Cited

U.S. PATENT DOCUMENTS

| | | | |
|---|---|---|---|
| 10,078,445 B2* | 9/2018 | Petkov | G06K 9/222 |
| 10,140,747 B2* | 11/2018 | Kim | H04M 1/72544 |
| 2003/0063090 A1* | 4/2003 | Kraft | G06T 13/80 |
| | | | 345/475 |
| 2004/0228532 A1* | 11/2004 | Fernandez | G06F 3/03545 |
| | | | 382/187 |
| 2008/0233986 A1* | 9/2008 | Abdelazim | G06K 9/00416 |
| | | | 455/466 |
| 2010/0058181 A1 | 3/2010 | Ganesan et al. | |
| 2011/0181619 A1* | 7/2011 | Kwon | H04M 1/72555 |
| | | | 345/629 |
| 2011/0314113 A1* | 12/2011 | Noda | G06F 3/0481 |
| | | | 709/206 |
| 2013/0038613 A1* | 2/2013 | Kim | H04M 1/72555 |
| | | | 345/473 |
| 2013/0063455 A1* | 3/2013 | Bayer | H04N 21/41407 |
| | | | 345/522 |
| 2013/0113808 A1* | 5/2013 | Kim | H04M 1/72544 |
| | | | 345/474 |
| 2014/0226901 A1* | 8/2014 | Spracklen | G06F 9/451 |
| | | | 382/167 |
| 2014/0267303 A1* | 9/2014 | Larkin | G06T 13/80 |
| | | | 345/473 |
| 2015/0309720 A1* | 10/2015 | Fisher | G06F 3/04847 |
| | | | 715/752 |
| 2015/0325026 A1* | 11/2015 | Haase | G06T 13/00 |
| | | | 345/473 |
| 2017/0221253 A1* | 8/2017 | Banerjee | G06T 11/001 |

OTHER PUBLICATIONS

Method and system for transmitting and verifying signatures wirelessly.

* cited by examiner

| | SET OF HEURISTICS FOR MODIFICATIONS | |
|---|---|---|
| DETECTED CONDITION | ADDITIONAL TIME | |
| DOT(S) | $X_1$ | (ADDED TO EXISTING TIME TO ENSURE MINIMUM MET) |
| SPACE BETWEEN 2 CONSECUTIVE STROKES | $X_2$ | (ADDED TO EXISTING TIME TO ENSURE MINIMUM MET) |
| 2 CONSECUTIVE STROKES INTERSECT | $X_3$ | (ADDED TO EXISTING TIME TO ENSURE MINIMUM MET) |
| STROKE IS ALONG A CURVE | $X_4$ | (ADDED AMONG SET OF POINTS ALONG THE CURVE TO ENSURE MINIMUM TIME IS MET) |

FIG. 5

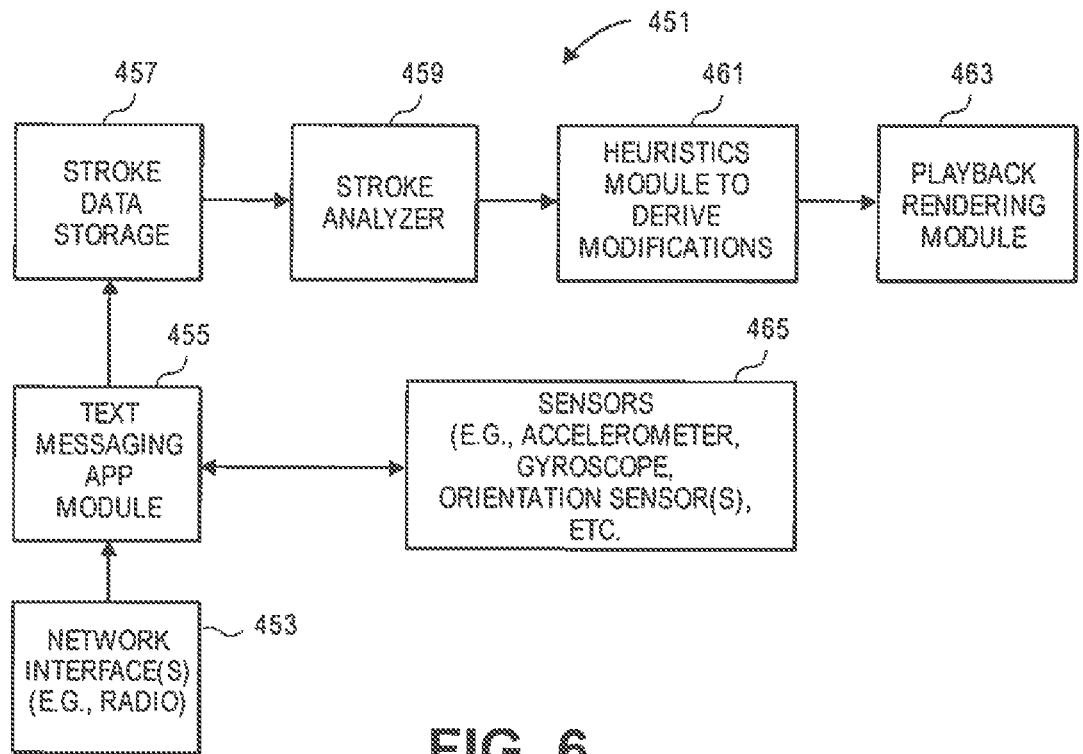

FIG. 6

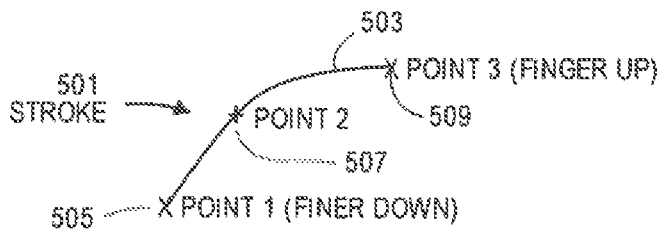
FIG. 7A
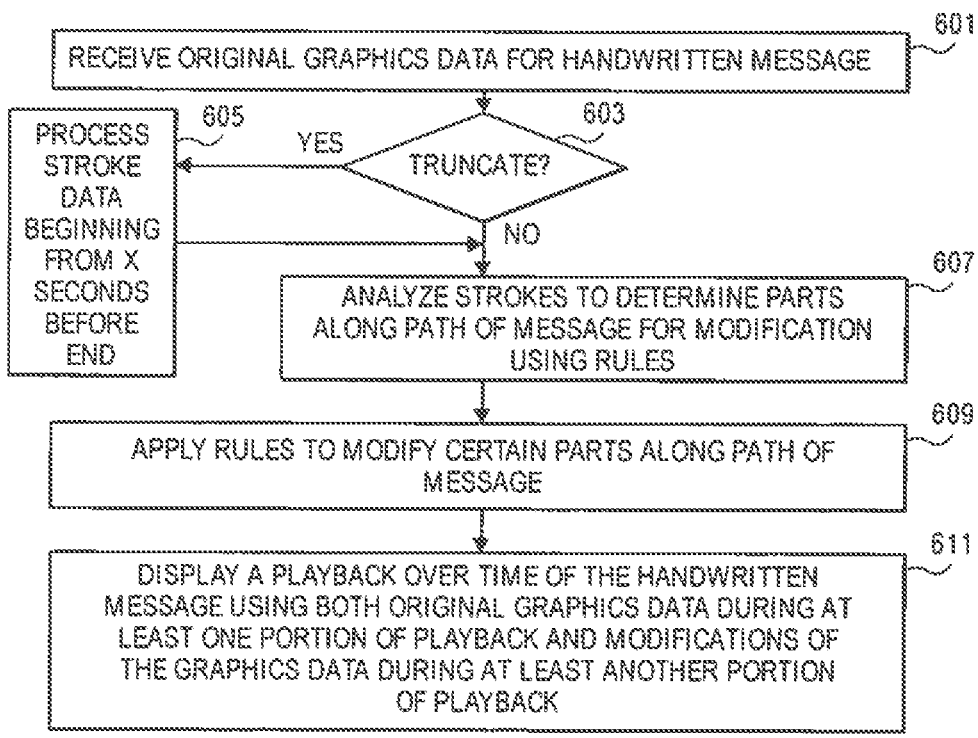
FIG. 7B
FIG. 8

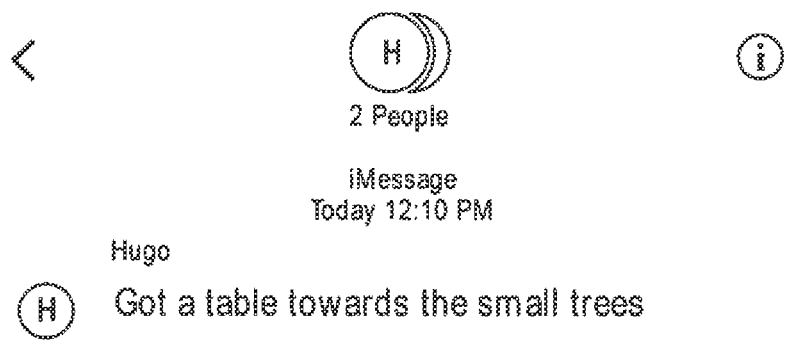
FIG. 12D

PLAYBACK OF HANDWRITTEN MESSAGE

This application claims the benefit of U.S. Provisional Patent Application No. 62/349,116, filed on Jun. 12, 2016, which application is incorporated herein by reference.

BACKGROUND

The embodiments described in this disclosure relate to messaging systems such as text messaging systems on cellular telephones or other communication devices or data processing systems.

The use of text messaging systems began many years ago. For example, wireless cellular telephone carriers, such as Verizon or AT&T, allowed text messages through the Short Message Service (SMS) for cell phones in the 1990s before smartphones were available. Typically, the amount of data transmitted has been limited by rules established by the carriers. Recently, as the use of smartphones (e.g. iPhones) and tablet computers (e.g. iPad) has increased, the text messaging systems have developed the ability to send images, such as photos or emojis. In addition, messaging systems such as iMessage from Apple Inc. of Cupertino, Calif. have allowed users to also send and receive text and images through "public" networks which include "public" WiFi access points and the Internet (in addition to using the wireless carrier's private cellular telephone networks), and messaging systems such as iMessage can seamlessly transition between the use of public and private networks depending on the availability of, for example, WiFi access points or the compatibility of the other user's device (which may not be compatible with iMessage).

SUMMARY OF THE DESCRIPTION

In the embodiments described herein, a system for processing a handwritten message received by a messaging app can modify playback over time of the handwritten message on the receiving device based upon a set of rules to determine how to modify the playback. In one embodiment, graphics data such as vector graphics data that represents the handwritten message is processed using the rules to determine how to modify the playback such that the resulting playback includes at least one modification over a portion of time of the playback.

A method according to one embodiment described herein can include the following operations: receiving graphics data representing a handwritten message, the graphics data specifying a playback over time of the handwritten message; processing the graphics data based on a set of rules (relating to a sequence of one or more strokes) to determine to add modifications to the display of the playback over time of the handwritten message; and displaying on a display of a receiving device, a playback over time of the handwritten message using both the graphics data and the modifications. In one embodiment, the displaying occurs within a message transcript of a messaging app on the receiving device which displays the playback, and the messaging app is configured to communicate SMS and MMS messages. In one embodiment, the messaging app is configured to communicate messages through at least one messaging server that receives the handwritten message from a sending device, and in one embodiment, the handwritten message is encrypted by the sending device and is decrypted by the receiving device after receiving the handwritten message from the messaging server. In one embodiment, the graphics data comprises vector graphics data and a canvas size of the sending device.

In one embodiment, the set of rules can be configured to provide the playback over time that has a natural cadence. In one embodiment, the set of rules can define a relationship between a sequence of strokes and modifications in time in the graphics, and wherein a random variation in the modification is used. In one embodiment, the modifications comprise changing time values in the graphics data based on a difference in size between the drawing input canvas on a sending device and an output canvas in a message transcript on the receiving device that displays the playback over time of the handwritten message.

In one embodiment, the modifications can include changing time values based on one or more of: (a) a detected dot; (b) a space between two consecutive strokes; (c) two consecutive strokes that intercept; (d) a change in force on the input device; (e) a stroke along a curved path; or (f) a series of consecutive dots. In one embodiment, the modifications can constrain the perceived velocity of the handwritten message during playback to less than a maximum velocity and more than a minimum velocity. The processing of the graphics data in order to determine how and whether to modify the playback of the handwritten message can be performed at run time when the handwritten message is displayed or immediately before run time. In one embodiment, the method can also include displaying an initial portion immediately at the beginning of playback and then beginning playback after the initial portion at a period of time before the end of the playback if the recorded time of the playback exceeds a predetermined period of time; in other words, if the playback were to take too long, then the playback is truncated by beginning the playback a predetermined time before the end and displaying immediately the result of that playback up to that predetermined period of time and then playing back the remainder of the handwritten message over the remaining period of time.

Another aspect of the embodiments described herein relate to a method for inputting the handwritten message. In particular, a method according to this aspect in one embodiment can include the following operations: displaying, on a display of a sending device, a user interface of a messaging app, wherein the user interface includes at least one of: an on-screen keyboard, a text staging region which displays text that is ready to be sent, or a message transcript which displays messages that have been sent and received; detecting, while displaying the user interface, a change in the orientation of the sending device; displaying, in response to the detected change in orientation, a handwritten message input canvas configured to receive a handwritten message created with strokes of a finger or stylus on a touchscreen; detecting, while displaying the handwritten message input canvas, another change in the orientation of the sending device; displaying, in response to the detected another change in orientation, the user interface of the messaging app wherein the text staging region shows the handwritten message which existed in the handwritten message input canvas when the another change was detected. In one embodiment, the detected change in orientation is a change from portrait orientation to landscape orientation, and the detected another change in orientation is a change from landscape orientation to portrait orientation. In one embodiment, these changes in orientation are detected by a set of one or more sensors which can include at least one of: an orientation sensor; or a gyroscope; or an accelerometer.

The methods and systems described herein can be implemented by data processing systems, such as one or more smartphones, tablet computers, desktop computers, laptop computers, smart watches, audio accessories, and other data processing systems and other consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

The present invention is illustrated by way of example and not limitation in the figures of the accompanying drawings in which like references indicate similar elements.

FIGS. 4B, 4C, 4D, and 4E show the playback at different points in time of the handwritten message on the receiving device.

FIG. 5 is a table which shows an example of a set of heuristics which can be used in one embodiment to create modifications of graphics data which is used at playback time by the receiving device to play back the handwritten message, such as the playback shown in FIGS. 4B, 4C, 4D, and 4F.

FIG. 6 shows an example of a data processing system which can perform one or more of the embodiments described herein.

FIG. 7A shows an example of a stroke which can be received by an input device, such as a touchscreen on a smartphone or tablet computer; typically a handwritten message includes one or more strokes.

FIG. 7B shows an example of graphics data obtained from an input device as the input device receives a handwritten message which can include one or more strokes of a finger or stylus on the input device.

FIG. 8 is a flowchart which illustrates a method according to one embodiment described herein.

FIGS. 12A, 12B, 12C, and 12D show an example of how a data processing system can switch automatically between modes during the process of receiving a handwritten message from a user of the data processing system.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
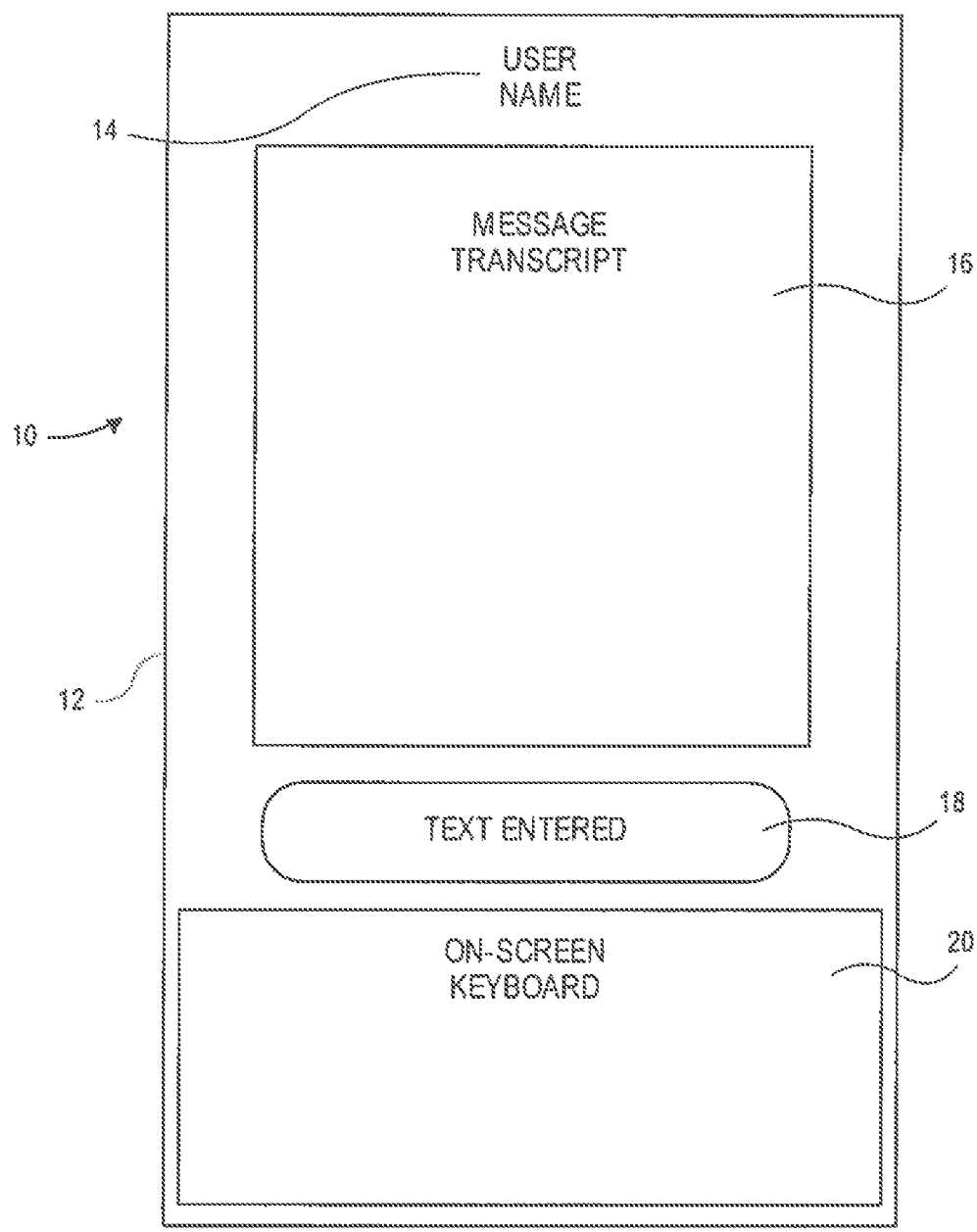
FIG. 1A shows an example of a user interface for a messaging app on a communication device.

The various embodiments described herein relate to messaging systems such as text messaging systems or "chat" messaging systems or other systems which allow devices to communicate messages between the devices. For example, iMessage from Apple Inc. of Cupertino, Calif. is an example of a messaging service for iOS devices and Mac (OS X) computers. Typically, a messaging system includes the plurality of client devices, each including at least one messaging app, and a set of one or more messaging servers that can receive messages from client devices and transmit messages to client devices. FIG. 1A shows an example of a user interface of a messaging app on a client device. The client device can be a communication device 10 which can be a smartphone or tablet computer or a desktop computer or a laptop computer or other data processing systems or other consumer electronics devices. In one embodiment, the device can include a conventional touchscreen that can both display images and also accept touch inputs from a user. The touchscreen 12 on the communication device can display the user interface of the messaging app which can include a message transcript 16 and an on-screen keyboard 20 below the message transcript 16. In addition, the user interface of the messaging app can include a user name 14 indicating the recipient, in one embodiment, of messages sent from the communication device 10. In addition, the user interface can include a text entry region 18 which indicates the content of the text entered by the user before it is sent; in a sense, the text entry region 18 is a text staging area indicating text that is ready to be sent to the recipient.

Figure 1B:
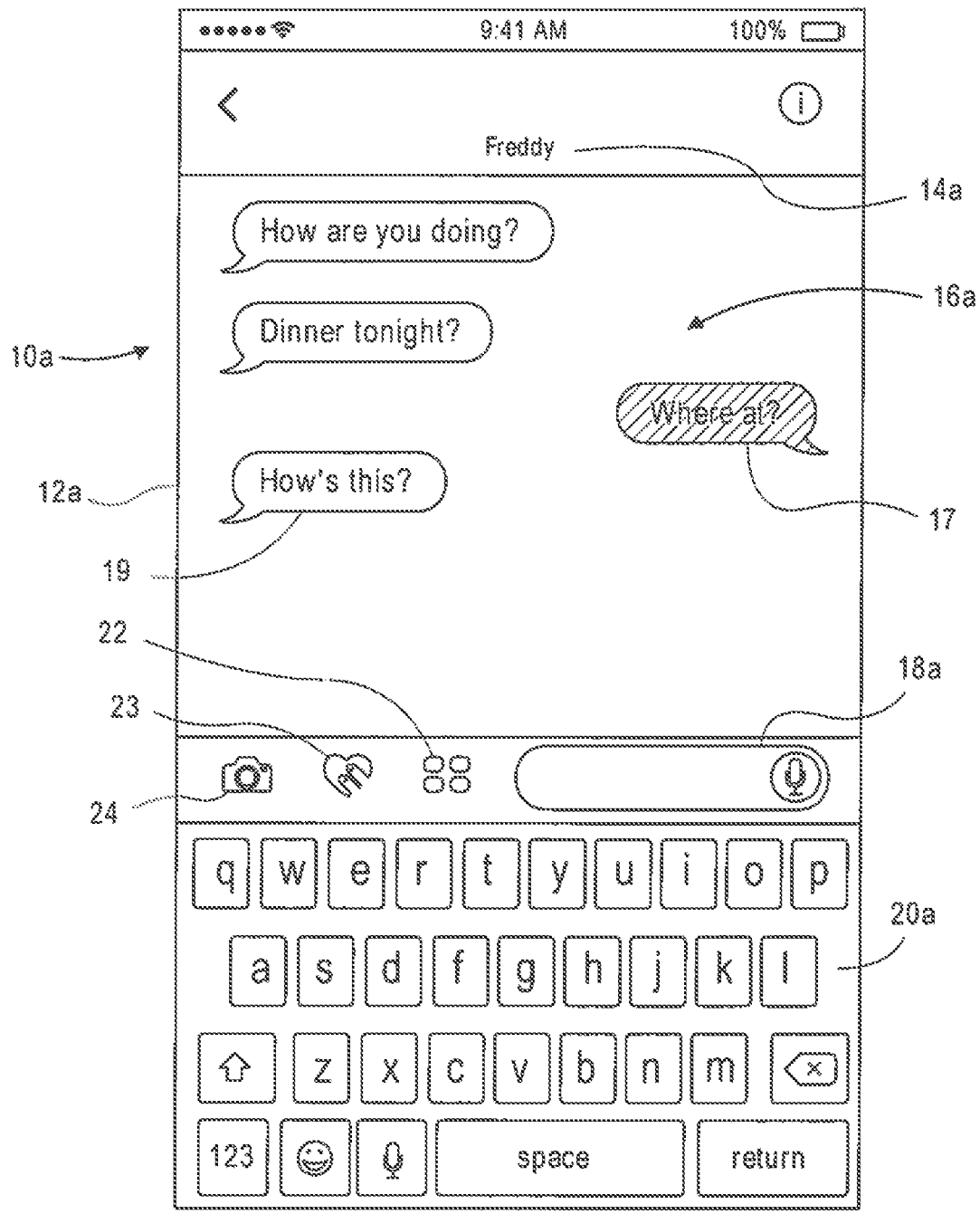
FIG. 1B shows another example of a user interface for a messaging app on a communication device.

FIG. 1B shows a more detailed example of a user interface of a messaging app on a communication device 10A. The user interface is displayed in this embodiment on touchscreen 12A and includes on-screen keyboard 20A, text entry region 18A, a message transcript 16A and a user name 14A showing the name of the other user to whom messages are sent and from whom messages are received. In the example shown in FIG. 1B, messages from Freddy (user name 14A) are shown on the left side of the message transcript 16A and messages sent by the user of communication device 10A are shown on the right side of message transcript 16A. Hence, message bubble 17 shows the message "Where at?" sent by the user of communication device 10A to Freddy as a response to the message from Freddy "Dinner tonight?". The message in message bubble 17 causes Freddy to respond with "How's this?" shown in message bubble 19. In one embodiment, the message transcript can be scrolled up and down and messages in the message transcript are presented in sequence according to their time, thus the user can see the actual chat or conversation over time by scrolling the view up or down. The user interface shown in FIG. 1B also includes three icons 22, 23, and 24 above the on-screen keyboard 20A and to the left of the text entry region 18A. The extension and plug-ins apps view icon 22, when selected, causes the display of a view of the installed extension apps and plug-ins that can operate with the messaging app, and the view provided can be a browsable view to allow the user to scroll through multiple pages showing all of the installed extension apps and plug-ins that are configured to operate with the messaging app according to the one or more embodiments described herein. The imaging extension app icon 23 can in one embodiment be an icon that when selected causes the launching of an imaging creation extension app or plug-in. The camera app icon 24 in one embodiment can, when selected, cause the communication device 10A to enter into a camera mode in which a camera of a device can capture still images or video images which can be placed into the message in order to send the image or video.

Figure 2:
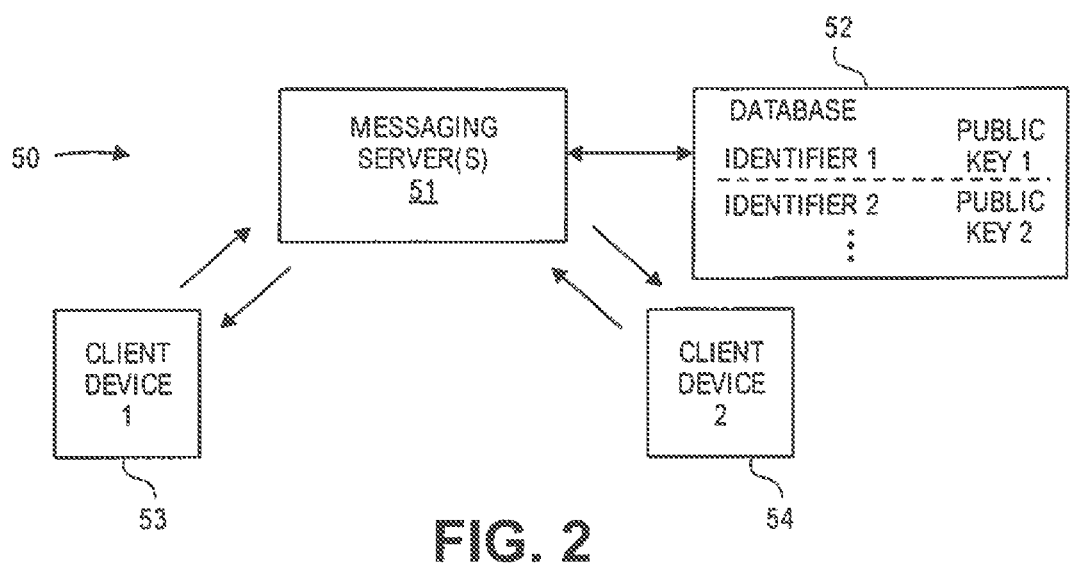
FIG. 2 shows an example of a messaging system which employs one or more messaging servers to provide a messaging service to a set of client devices.

A brief overview of an example of a messaging system will now be provided in conjunction with FIG. 2. A messaging system 50 can include a plurality of client devices, such as client devices 53 and 54. Each of these client devices can include at least one messaging app that is configured to operate with extension apps or plug-ins for the messaging app according to the one or more embodiments described herein and a sending client device can provide for backward compatibility for older devices. In a typical messaging system, there can be millions of client devices communicating through a set of messaging servers. In one embodiment, a plurality of messaging servers can be configured to receive encrypted messages from sending devices and then transmit those encrypted messages to the receiving devices. Another set of servers can be configured to receive non-text content, such as images or other "attachments" and provide those images or attachments in download operations to receiving devices in response to requests from those receiving devices to obtain the images or attachments. In one embodiment, a sender's outgoing message is individually encrypted for each of the receiver's devices. In one embodiment, an asymmetric RSA encryption algorithm can be used to perform the encryption. In one embodiment, the public RSA encryption keys of each of the receiving devices can be retrieved from a directory service (maintained by the one or more messaging servers) which includes a database, such as a database 52 which is coupled to the one or more messaging servers 51. When a client device, such as client device 53 seeks to send a message to another client device, it identifies the other client device (such as by an email address or a telephone number or other identifier) to the one or more messaging servers 51. That identifier is sent from the client device, such as client device 53 to one or more messaging servers 51 which then perform a lookup operation in the database 52 based upon the supplied identifier to retrieve the public key that corresponds to that identifier. That public key is then transmitted back to the client device which requested the public key for that particular receiving device, and then the client device can encrypt the message using the public key or using another key (e.g. a symmetric) which can be randomly generated, and that another key is encrypted with the public RSA encryption key for the particular receiving device. In one embodiment, the randomly generated key can be randomly generated on a per message basis. In one embodiment, the resulting messages, one for each receiving device, consists of the encrypted message text, the encrypted message key, and the sender's digital signature, and this resulting message for each receiving device is then uploaded to the one or more messaging servers 51 for delivery to the recipient client devices, such as client device 54. In one embodiment, the messaging system 50 can be configured to operate through "public" networks which include public WiFi access points (such as WiFi access points in coffee shops, airports, etc.) and also the Internet. The messaging apps on each of the client devices 53 and 54 can also be configured to operate with the "private" networks provided by wireless cellular telephone carriers, such as Verizon and AT&T, and the messaging apps can be configured to seamlessly switch between the use of the private and public networks depending upon the availability of each and also depending upon the compatibility of each of the client devices in a messaging session. In one embodiment, the messaging servers 51 can include a set of push notification servers which receive the uploaded text messages and which "push" those text messages to receiving devices.

A communication device, such as communication device 10A or client devices 53 and 54 can include a touchscreen or other touch input device (e.g. a touchpad on a laptop computer or other types of computers) that can receive the user's input through touches, such as a user's finger on the touchscreen or the stylus used on the touchscreen to create a handwritten message. For example, a user can place the user's finger on the touchscreen and then slide the finger across the touchscreen to create one or more strokes. Typically, a handwritten message will have many strokes, where each stroke can include a finger down and then a finger up sequence of operations on the touchscreen or other touch input device. The input process performed by the touchscreen or other touch input device on the sending device can capture the strokes made by the user's finger or stylus or other object and can create graphics data, such as the graphics data shown in FIG. 7B, that represents those strokes received during the process of inputting the handwritten message on the touchscreen or touch input device. The input process records the strokes over time, and this can allow a receiving device which receives the handwritten message to play back the handwritten message as an animation or movie over time. In the one or more embodiments described herein, the playback of the handwritten message over time as an animation is modified such that, in one embodiment, the playback over time on the receiving device does not match the inputting of the handwritten message on the sending device, and this mismatch will be illustrated by comparing FIGS. 3A, 3B, and 3C to FIGS. 4B, 4C, 4D, and 4E.

Figure 3A:
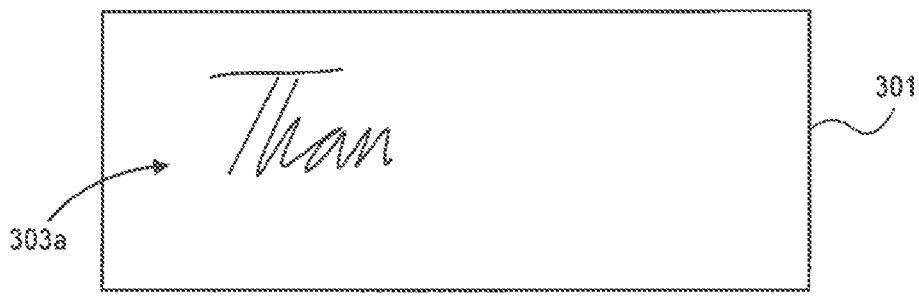
FIGS. 3A, 3B, and 3C show the inputting of a handwritten message at different points in time during the process of inputting the handwritten message.
Figure 3B:
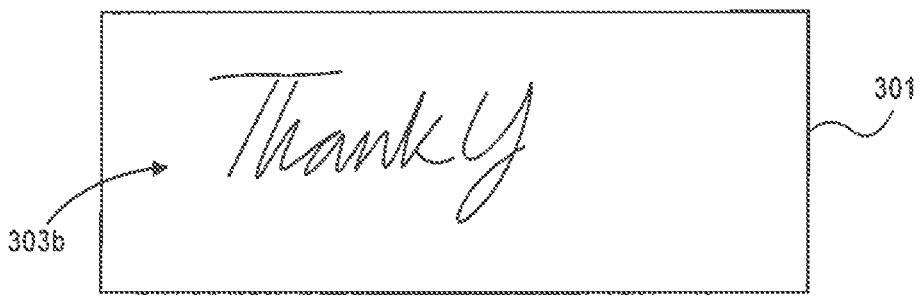
Figure 3C:
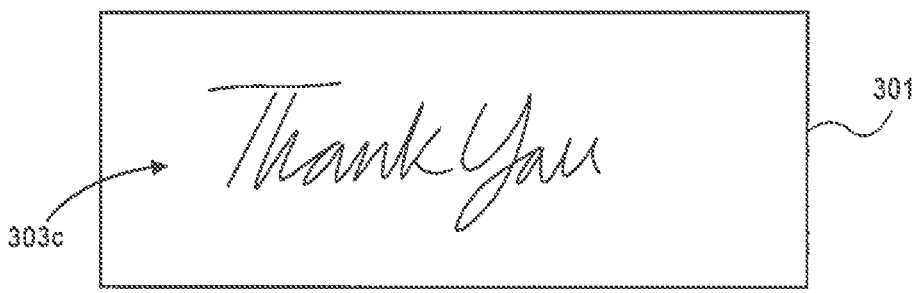

FIGS. 3A, 3B, and 3C show a handwritten message input canvas 301 at different points in time as the touchscreen in this case receives the handwritten message within the handwritten message input canvas 301. Handwritten message 303A shows an initial portion of the handwritten message before the user has finished the word "thank" on the touchscreen or touch input device. Handwritten message 303B shows the handwritten message at a later point in time in which the user has completed the word "thank" and has begun the word "you". Handwritten message 303C in Figure C shows the completion of the handwritten message which follows the snapshot in time shown as handwritten message 303B in FIG. 3B. The entire input process may last only a few seconds or perhaps even many tens of seconds. In one embodiment, the entire process can be recorded in real time and the presentation of the handwritten message on the touchscreen can be presented in real time (on the sending device) as the user traces the strokes on the touchscreen to create the handwritten message.

It will be understood that FIGS. 3A, 3B, and 3C show the touchscreen of a sending device, and these will now be contrasted with the touchscreen of a receiving device (shown in FIGS. 4B, 4C, 4D, and 4E) which receives the handwritten message 303C but which can play back the handwritten message differently by modifying in one embodiment time parameters in order to achieve a desired cadence (such as a predetermined cadence) at playback time of the handwritten message on the receiving device. The desired cadence can be achieved, in one embodiment, by analyzing the input data (that comprises information about the author's strokes in the handwritten message) to determine where modifications may be necessary because a rule for a stroke or successive strokes is violated, and the playback uses the modifications, in one embodiment, only when a rule is violated. This can, in one embodiment, retain a human factor or characteristic in those portions during playback that are not modified while removing one or more potentially offensive playback portions by using the one or more modifications. In a sense, the recorded input data serves as a model for the author and aberrations from the desired behavior (e.g. cadence) are eliminated.

Figure 4A:
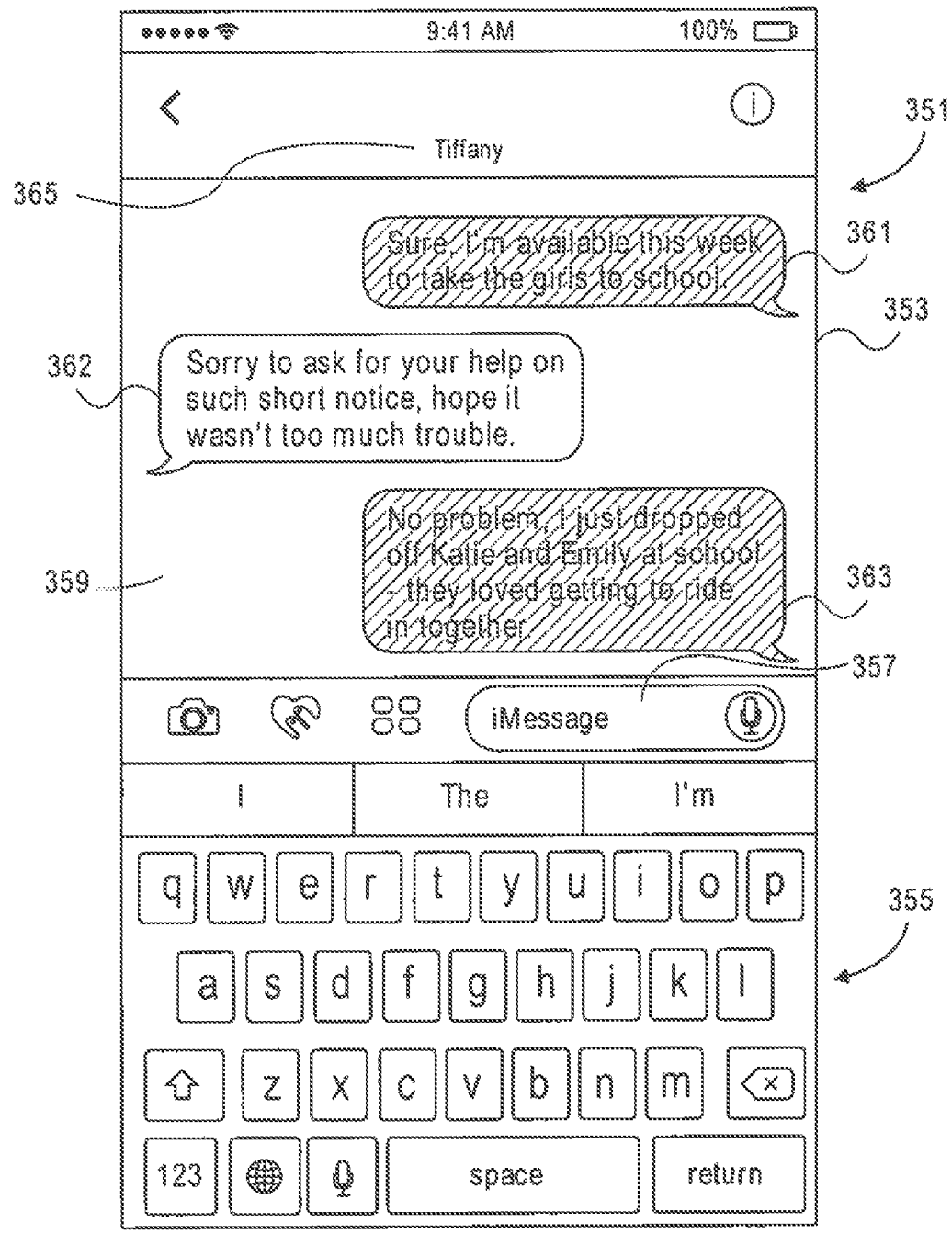
FIG. 4A shows an example of a user interface of a messaging app on a communication device.
Figure 4B:
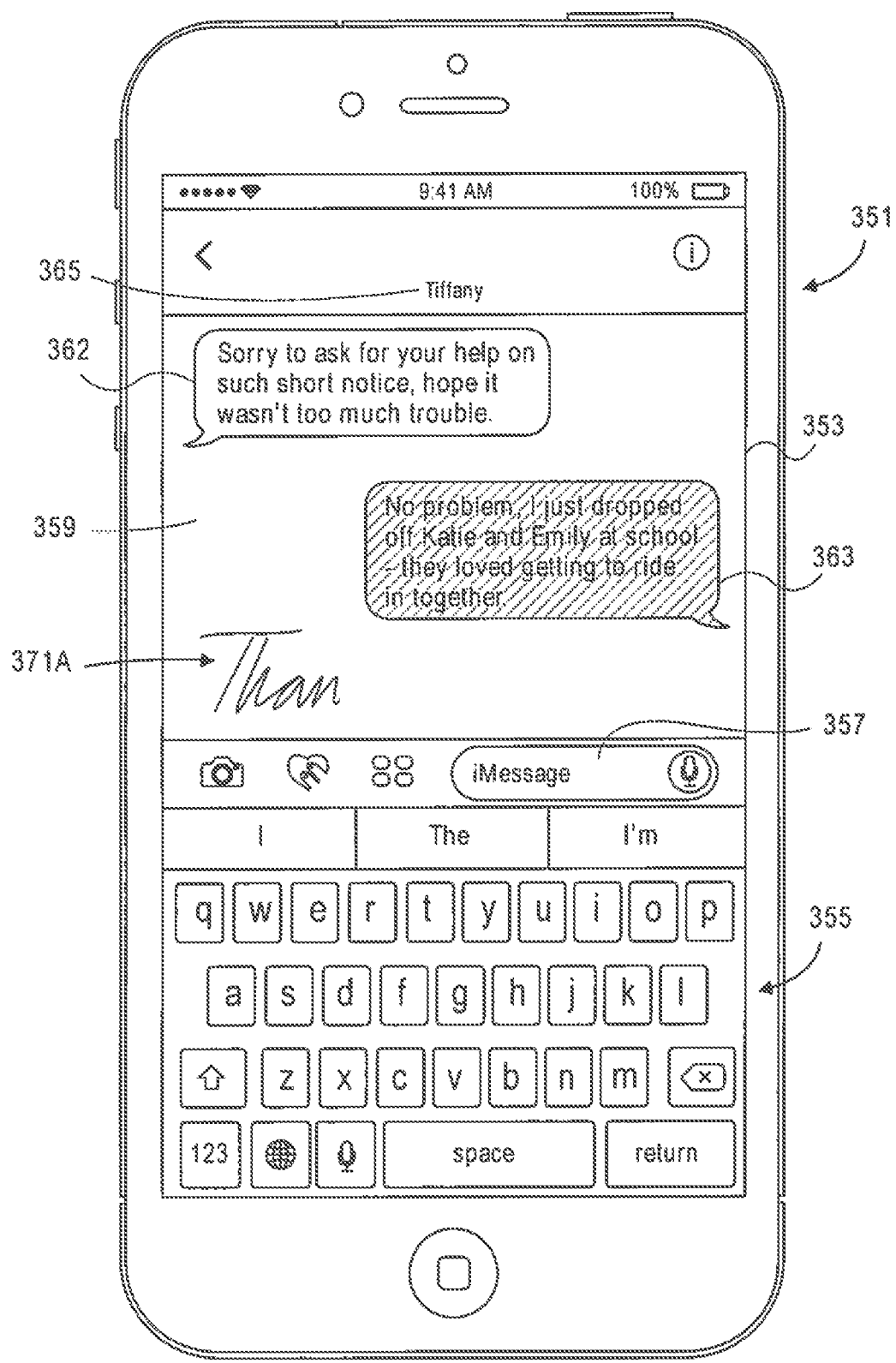
FIGS. 4B, 4C, 4D, and 4E show the user interface of the messaging app of FIG. 4A as the messaging app plays back over time the handwritten message which has been received from the sending device; in particular.

Referring now to FIG. 4A, a receiving device can be a communication device 351 which displays a user interface of a messaging app. That user interface can include an on-screen keyboard 355, a text staging region 357, and a message transcript 359 all of which are displayed on a touchscreen of the communication device 351. The touchscreen 353 also displays the user name 365 as well as three message bubbles 361, 362, and 363 in the message transcript 359. FIG. 4A shows the state of the user interface of the messaging app prior to receiving the handwritten message 303C. At some point, the communication device 351 receives the handwritten message which can be in the form of graphics data such as the graphics data shown in FIG. 7B. The communication device 351 receives the handwritten message from the sending device through a set of one or more messaging servers such as one or more messaging servers 51. The receiving device can then process that graphics data and create modifications so that the playback over time as an animation of the handwritten message on the receiving device does not match the real time inputting of the handwritten message on the sending device (such as the sending device which included the handwritten message input canvas 301). This is different than a linear playback that plays back the handwritten message in the same way as it was inputted. For example, FIG. 4B shows a snapshot in time of the playback on the receiving device which is the communication device 351. At this snapshot shown in FIG. 4B, the handwritten message 371A appears to be similar to the handwritten message 303A and in one embodiment the snapshot in FIG. 4B may be at the same time as the input message shown as handwritten message 303A in the input process. For example, if the user finished the letter "n" at the end of handwritten message 303A at 2.2 seconds after beginning the input of the handwritten message, the handwritten message shown at the snapshot in FIG. 4B may also be at the same time (2.2 seconds), after beginning the playback of the handwritten message.

Figure 4C:
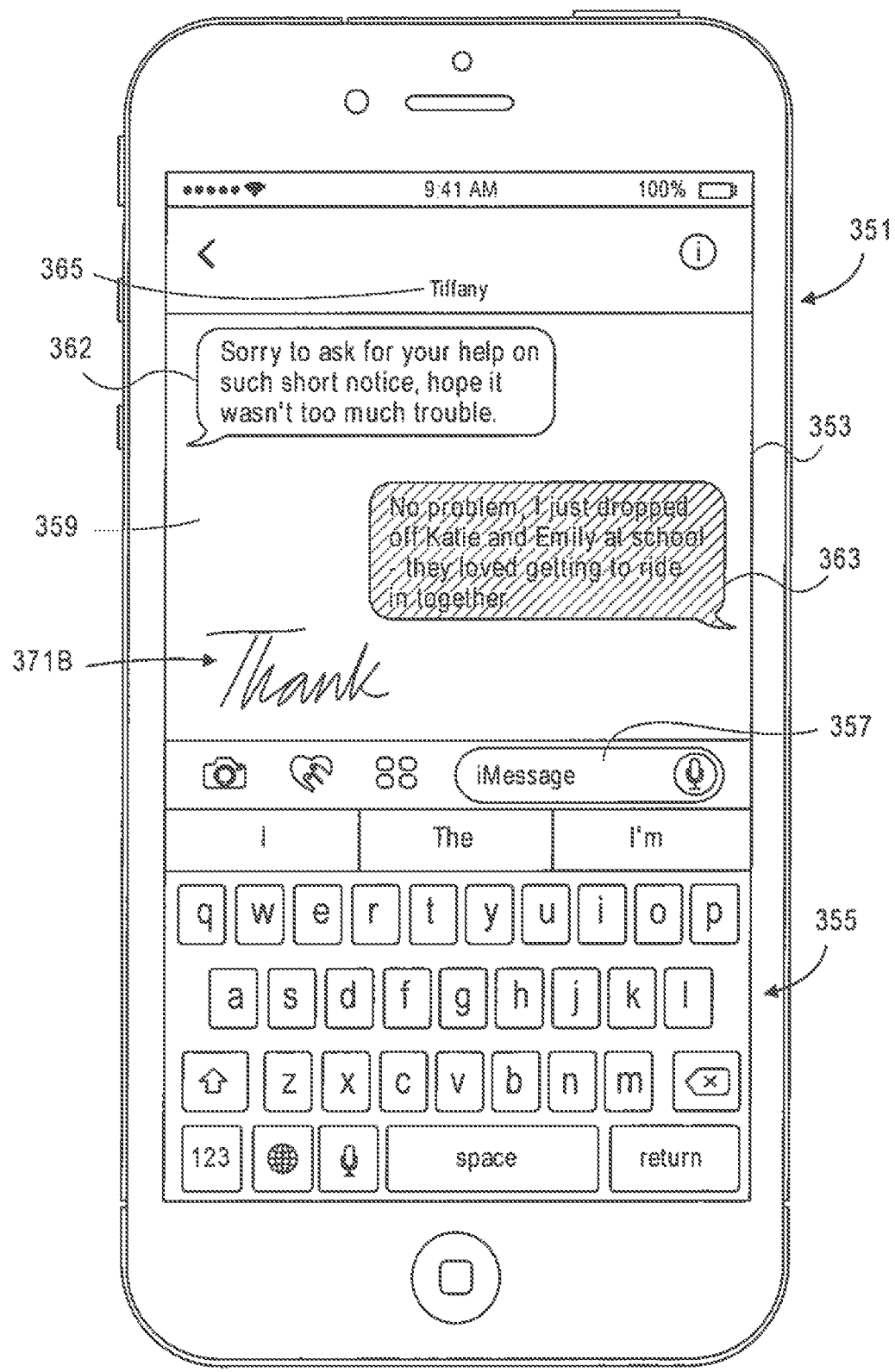
Figure 4D:
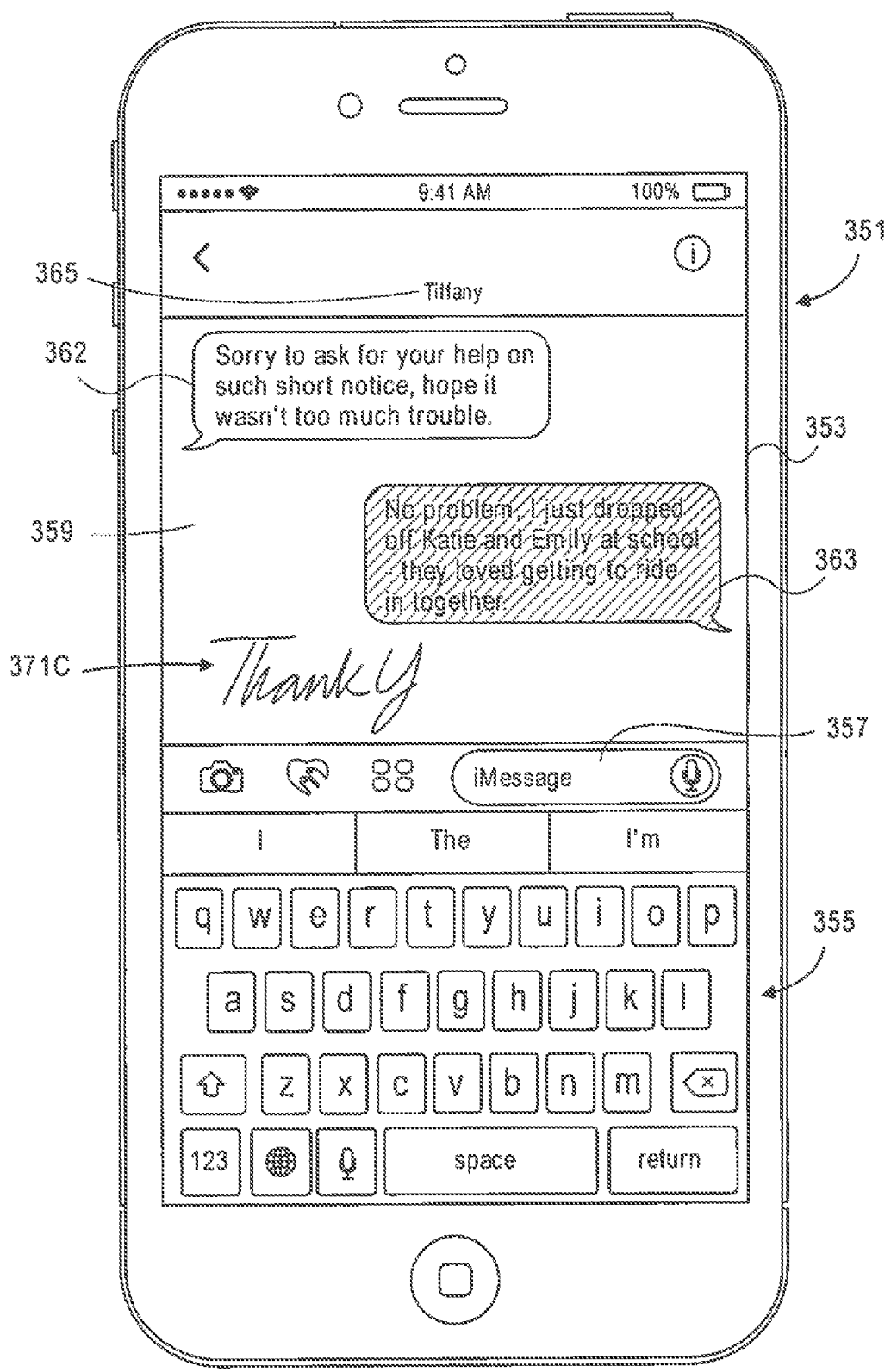

The snapshot in time shown in FIG. 4C follows the snapshot shown in FIG. 4B. The handwritten message 371B now shows the completion during playback on the receiving device of the word "thank" but the playback on the receiving device has been modified to slow the playback down. In particular, handwritten message 371B may be three seconds into the playback process on the receiving device while handwritten message 303B was recorded on the handwritten message input canvas 301 at 3 seconds. FIG. 4D shows another snapshot in time of the user interface of the messaging app on the receiving device, wherein the user interface shown in FIG. 4D is after the user interface shown in FIG. 4C. The playback of the handwritten message at the snapshot shown in FIG. 4D shows the handwritten message 371C which appears similar to the handwritten message 303C, but the playback time has been in this embodiment slowed down relative to the realtime input process shown in FIG. 3B. For example, if the Y was completed 3 seconds after the start of the input of the handwritten message 303B, the Y in handwritten message 371C may be completed 3.5 seconds from the start of the playback on the receiving device.

Figure 4E:
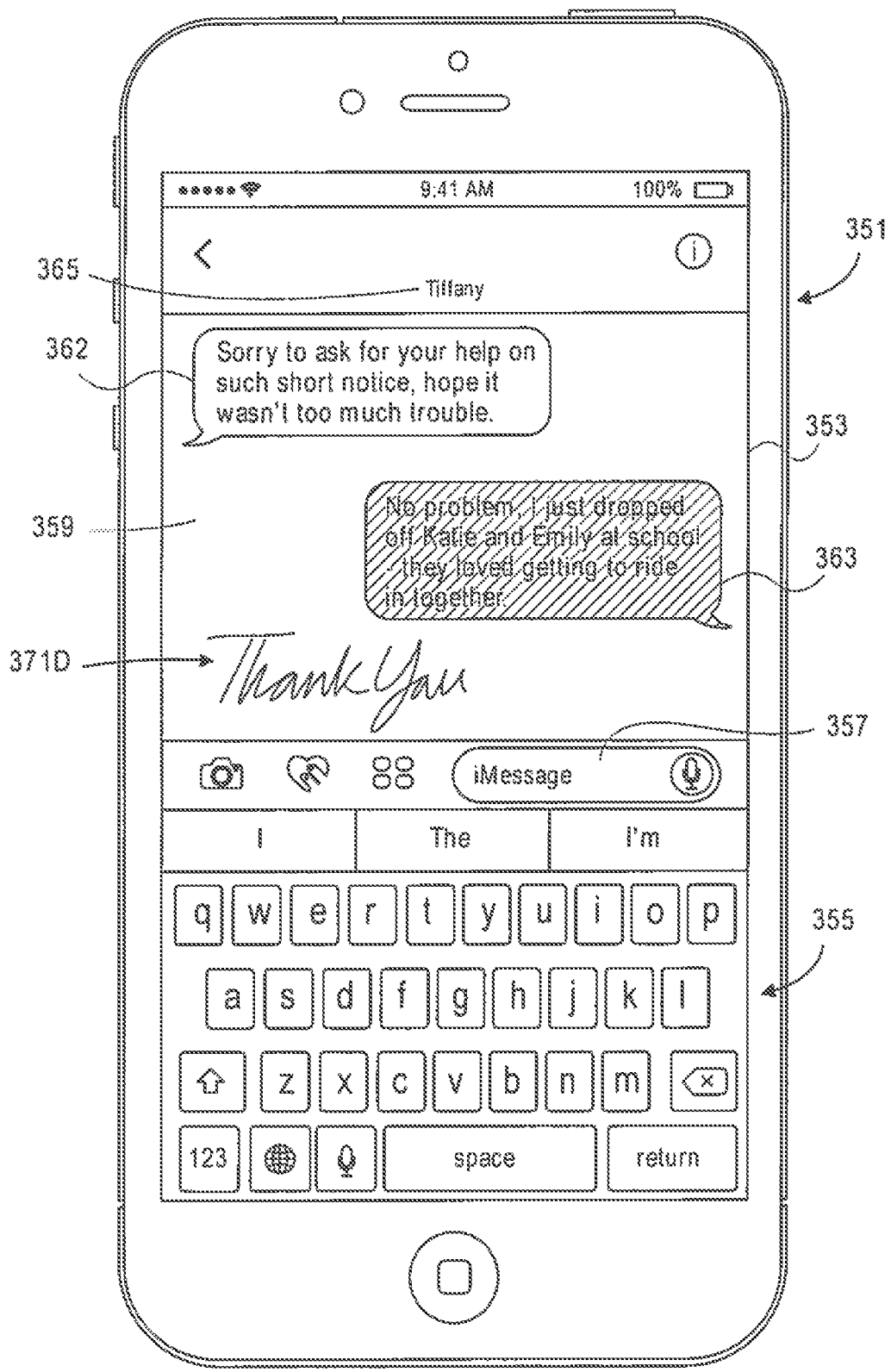

FIG. 4E shows the receiving device having completed the playback of the handwritten message which is now shown as handwritten message 371D. The snapshot in time shown in FIG. 4E follows the snapshot in time shown in FIG. 4D and the entire playback time on the receiving device may be longer than the entire input time in one embodiment. For example, the entire input time on the sending device for the handwritten message 303C may be less than 4 seconds while the entire playback time can be longer than 4 seconds on the receiving device. The sending device, in one embodiment, sends the graphics data (e.g. see FIG. 7B) to the receiving device without any modifications so that the graphics data received by the receiving device reflects the actual input received on the input device (e.g. touchscreen) of the sending device.

In one embodiment, a set of heuristics can be used to create the modification of the playback on the receiving device. In one embodiment, these modifications may be determined at run time of playing back the handwritten message or immediately before run time of playback the handwritten message. In one embodiment, these modifications can involve changing time parameters to either slow down the playback or speed up the playback (e.g. slow down or speed up in a non-linear fashion). In another embodiment, these modifications can include modifications in time as well as modifications in how graphics are rendered such as changing the width of lines or curves based on a set of heuristics for modifications. FIG. 5 shows a table which indicates one embodiment of a set of heuristics which can be used to modify playback of a received handwritten message. The receiving device can use the set of heuristics to modify the playback on the receiving device. These heuristics are used when analyzing the graphics data which represent the strokes used during inputting of the handwritten message.

FIG. 7A shows an example of a stroke 501 which includes at least 3 points (points 505, 507, and 509) along the stroke as shown in FIG. 7A. The stroke 501 creates the curve 503 which can be defined by the points 505, 507 and 509. It can also be seen that point 1 is a finger down operation while point 3 (point 509) is a finger up operation. The sending device can process these strokes to create the graphics data shown in FIG. 7B. The graphics data 550 shown in FIG. 7B can have a plurality of columns, such as columns 554 and 556 which provide data for points along the stroke, such as point 558 and point 559 shown in graphics data 550. Column 552 shows the different points as well as finger down and finger up for each stroke in one embodiment. Column 554 shows the X coordinate value for each point, and column 556 shows the Y coordinate value for each point along the stroke. The column 556 shows the velocity of the input from the prior point to the current point, and it is this velocity which can be modified at playback by the receiving device. The graphics data 550 can also include other columns, such as a column indicating a force detected by the input device (e.g. touchscreen) for a given point and can also include other additional columns 563 which can provide an extendible or extensible data format for the graphics data 550 (such as, for example, stroke type, timestamp, type of previous stroke, distance from previous stroke, etc.). In one embodiment, the sending device generates the graphics data by processing the user's inputs in the handwritten message input canvas and then sends this graphics data, such as graphics data 550 to a receiving device, an example of which is shown in FIG. 6 as receiving device 451.

Referring now to FIG. 6, receiving device 451 includes one or more network interfaces 453 which can be one or more radios, such as a WiFi radio or a cellular telephone radio, etc. These one or more network interfaces 453 are coupled to a text messaging app module 455 which can receive text messages and other messages and present them in a user interface of the messaging app, such as the user interface shown in FIG. 4A, 4B, etc. The text messaging app module 455 in one embodiment can also be coupled to one or more sensors which can be used to perform the method for switching between modes during the process of inputting a handwritten message as shown in FIGS. 12A, 12B, 12C, and 12D. These one or more sensors can include an accelerometer or a gyroscope or an orientation sensor for example. It will be appreciated that the sending device can also include such sensors in order to perform the methods shown in FIGS. 12A through 12D. The text messaging app module 455 can receive the graphics data 550 and provide it to the stroke data storage 457 so that the strokes can be analyzed by stroke analyzer 459 which can utilize the heuristics module 461 to create modifications for playback so that the handwritten message can be played back by the playback rendering module 463. In one embodiment, the heuristics module 461 can use the set of heuristics shown in FIG. 5.

A method for processing on a receiving device the graphics data to achieve modified playback is shown in FIG. 8 which presents one embodiment in which the modifications include the addition of time. In operation 601 the original graphics data for the handwritten message is received by the receiving device. The original graphics data can be similar to the graphics data 550 shown in FIG. 7B. Then in operation 603 the receiving device can determine whether or not to truncate the playback because the entire playback time exceeds a predetermined limit (such as, for example, a limit of 20 seconds). The graphics data received in operation 601 may indicate the entire playback time or the graphics data may need to be processed in order to determine whether or not the playback should be truncated. If the playback is truncated, the stroke data is processed for creating modifications beginning with several seconds (e.g., X seconds) before the end of the playback. Operation 605 will cause the presentation of the handwritten message prior to that time at the very beginning of the playback so that the beginning portion of the handwritten message is not animated. In other words, if the playback is truncated, the beginning portion of the handwritten message (e.g. the first 10 seconds) is presented immediately without any animation in one embodiment, and then the animation begins (and can be modified as described herein). Then in operation 607, the strokes are analyzed to determine whether there are parts along the path of the handwritten message which can be modified using the heuristics, such as the heuristics shown in FIG. 5. Then in operation 609, the heuristics can be applied to modify certain parts along the path of the handwritten message, and then in operation 611 the playback over time of the handwritten message can be displayed. In one embodiment, this playback uses both the original graphics data during at least a portion of the playback wherein this data is not modified during that portion (and the playback during that portion on the receiving device matches the input on the sending device) and another portion of the playback uses the modifications of the graphics data such that the playback is based upon both the original graphics data during the portion of time and modified graphics data during another portion of the playback time.

Operation 607 and 609 can use in one embodiment the set of heuristics shown in FIG. 5 which first detect certain conditions in the graphics data and then cause the modification of time to modify the playback. Column 403 in the set of heuristics 401 show a set of detected conditions which can be detected in the graphics data when the strokes are analyzed in operation 607. Column 405 in the set of heuristics 401 specifies a particular modification which can occur in response to the particular detected condition. For example, if the detected condition is one or more dots in the graphics data, then the modification can be to add additional time to ensure that the minimum time or minimum velocity is satisfied at playback time on the receiving device. For example, if the sender very quickly tapped out three dots in a row (consecutively), the receiving device can detect a consecutive series of dots (such as . . . ) and determine that the elapsed time indicated in the graphics data is less than a predetermined minimum time or indicates a velocity (from beginning dot to ending dot) of more than a predetermined velocity. This can cause the receiving device to modify the playback of the consecutive dots by introducing additional time so that the playback of a series of consecutive dots takes longer than a quick " . . . " which was input by the user of the sending device. Similarly, a single dot which follows a word, and then another word follows the dot may be input by the user of the sending device very quickly, and the receiving device can decide to slow the playback down on the receiving device by introducing additional time to ensure that a minimum time is met or that a maximum velocity has not been exceeded. Other detected conditions can include detecting a space between two consecutive strokes 407 or detecting that two consecutive strokes intercept 408 or detecting that a stroke is along a curve or a line 409. In each case, the receiving device can introduce additional time to ensure that a minimum time is met such as a minimum time between consecutive strokes, etc. In one embodiment, the additional time values, such as X1 or X2 can be randomized slightly when they are used so that the actual additional time X1 added for each dot may be slightly varied and this is shown as variations 759 and 760 which appear random in the modifications which were applied to the curve 753.

In one embodiment, the modifications performed in operation 609 (or in operation 705) can include modifications that are based on a difference in size between a drawing input canvas on the sending device and an output canvas in a message transcript on the receiving device which displays the modified playback of the handwritten message. For example, when the input canvas is on a large iPad and the output canvas is on a small iPhone, it may be desirable to modify the playback on the small iPhone by increasing the playback speed so it does not appear to take too long. In one embodiment, playback speed is determined based on the number of pixels on screen which are desired to be drawn per frame of animation (e.g. each frame in 60 frames of animation per second). The graphics data is processed to create a series of dots that are close enough together that they give the appearance of a single continuous line on the display screen; once enough points/dots are accumulated in a given frame that the total distance exceeds a predetermined distance (e.g. 10 pixels) on screen, then the frame is considered filled and processing proceeds to the next frame. The scale can be used, in one embodiment, at this point to increase or decrease the pixel distance each frame should contain which in turn impacts the appearance of the playback speed (as modified) on the receiving device.

Figure 9:
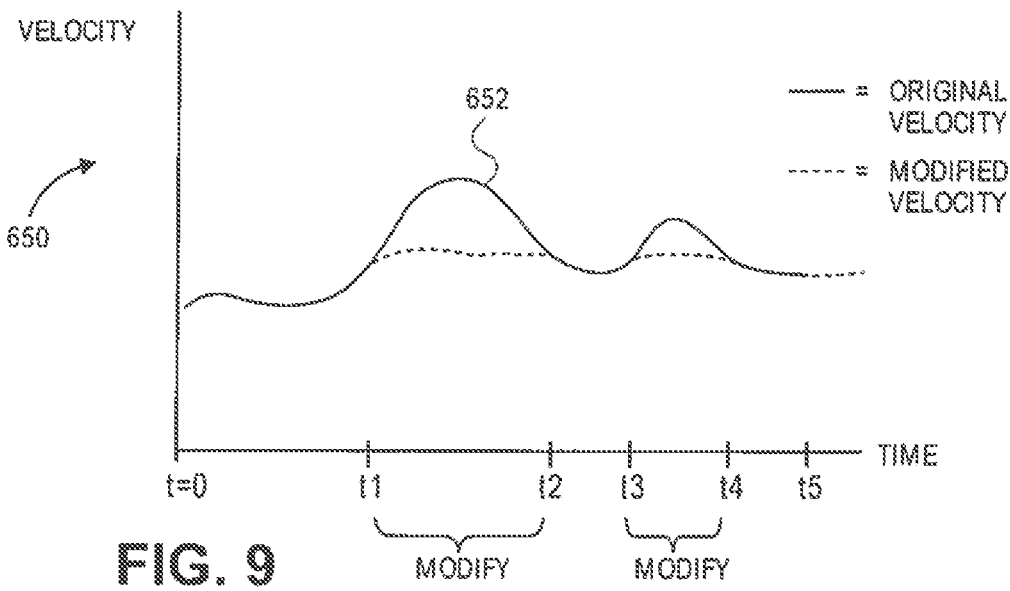
FIG. 9 shows a graph which illustrates at least one embodiment described herein.

FIG. 9 shows an example of how the playback can be modified at a receiving device based upon a set of heuristics. The graph 650 shown in FIG. 9 shows a curve 652 on a graph of velocity versus time. The original input velocity is shown as the solid line and the modified velocity is shown as a dashed line which appears in three time periods as shown in FIG. 9. The example shown in FIG. 9 can be achieved using the method shown in FIG. 8 by adding lime when the original input velocity is too high and exceeds a maximum velocity which occurs in two time periods shown in FIG. 9. In particular, during the time between T1 and T2, the original velocity exceeds a predetermined maximum velocity which causes at playback the receiving device to use the heuristics to modify the playback by introducing additional time thereby slowing down the playback of the handwritten message which occurs between the times T1 and T2 and also occurs in the time between times T3 and T4. Because the playback will slow down at two portions of the handwritten message, this can cause the modified playback to extend longer in time than the original input message in the original graphics data, and this can be seen by the modified velocity curve extending past time T5. In the embodiments shown in FIG. 9, no modification to the original graphics data was used or created between the times T0 and T1. Similarly, no modification was made to the original graphics data which was used to present the handwritten message as it was received on the sending device during the time between times T2 and T3 and also during the time between times T4 and T5.

Figure 10:
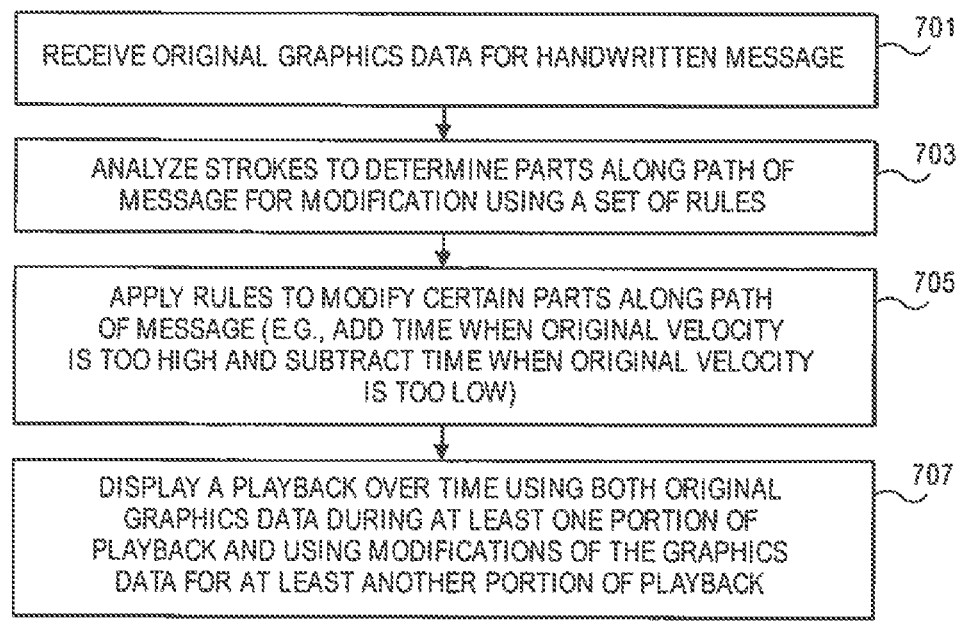
FIG. 10 is a flowchart which illustrates a method according to at least one embodiment described herein.
Figure 11:
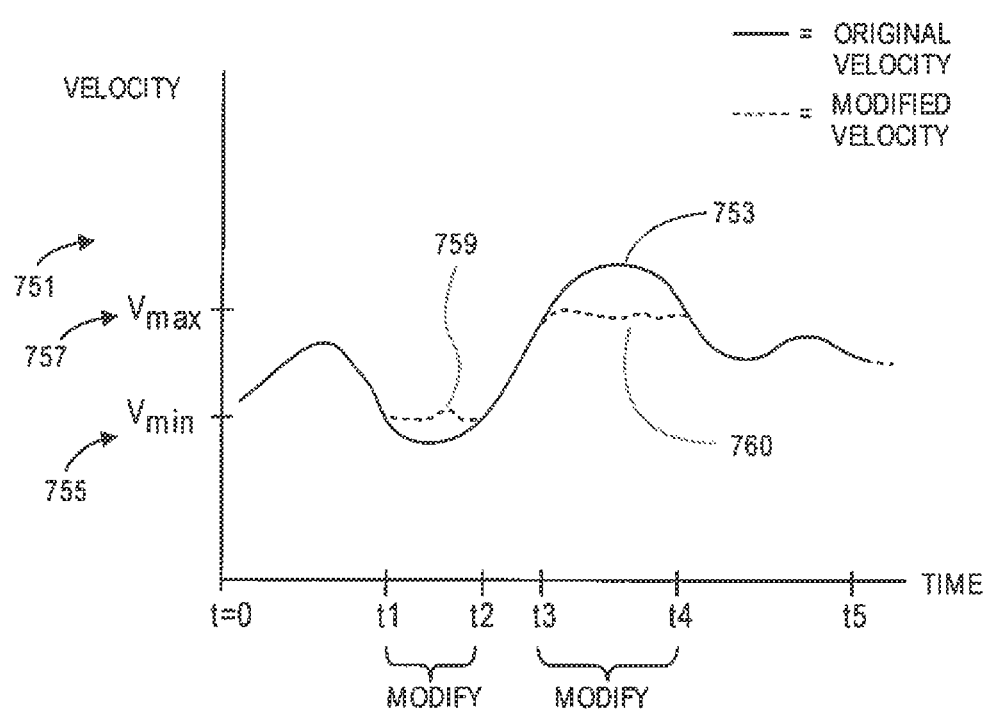
FIG. 11 is a graph which illustrates a result which can be produced by at least one embodiment described herein.

In an alternative embodiment, time can be added and removed in order to clamp the playback within constraints of a minimum velocity and a maximum velocity. FIG. 10 shows a method which can achieve this effect, and FIG. 11 shows a graph 751 which shows the result of modifying original graphics data to create a modified playback. In a method shown in FIG. 10, operation 701 involves the receipt by the receiving device of the original graphics data from the sending device. This original graphics data can be similar to the graphics data 550 shown in FIG. 7B. Then in operation 703, the receiving device analyzes the strokes to determine one or more parts along the handwritten message for modification using a set of rules, such as the set of heuristics 401 shown in FIG. 5. Then in operation 705, the receiving device can apply the rules to modify certain parts along the path. For example when the original velocity is too high, the set of heuristics can be used to add time to slow the velocity down, and when the original velocity is too low, time can be subtracted from the original data to increase the velocity. It will be appreciated that the modification of the time parameter can be achieved by modifying the velocity value in certain embodiments. Then in operation 707, the receiving device can display the playback over time of the handwritten message which presents an animation or simulation of the handwritten message which can include the use of both the original graphics data during at least a portion of the playback time and the use of modifications of the graphics data for at least another portion of the playback time. This can be seen in FIG. 11 which shows a graph 751 in which playback is modified during the time between times T1 and T2 and also during the time between T3 and T4 but during the other time of the playback the original graphics data is used. During the time between times T1 and T2, the original velocity is too low and falls below the predetermined minimum velocity 755, and this causes the receiving device to modify the original graphics data to create a modified velocity which can have randomly introduced variations as shown as variations 759. In the time between times T2 and T3, the original graphics data satisfies both the minimum velocity 755 and the maximum velocity 757 which were both constraints applied during playback. However, at time T3 the original velocity begins to exceed the maximum velocity 757, which causes the set of heuristics to modify the playback to constrain the velocity of the playback in the time between times T3 and T4. In the examples shown in FIG. 11, the modified playback between times T3 and T4 can include small random variations to the modified data such as random variations 760 shown in FIG. 11.

Figure 12A:
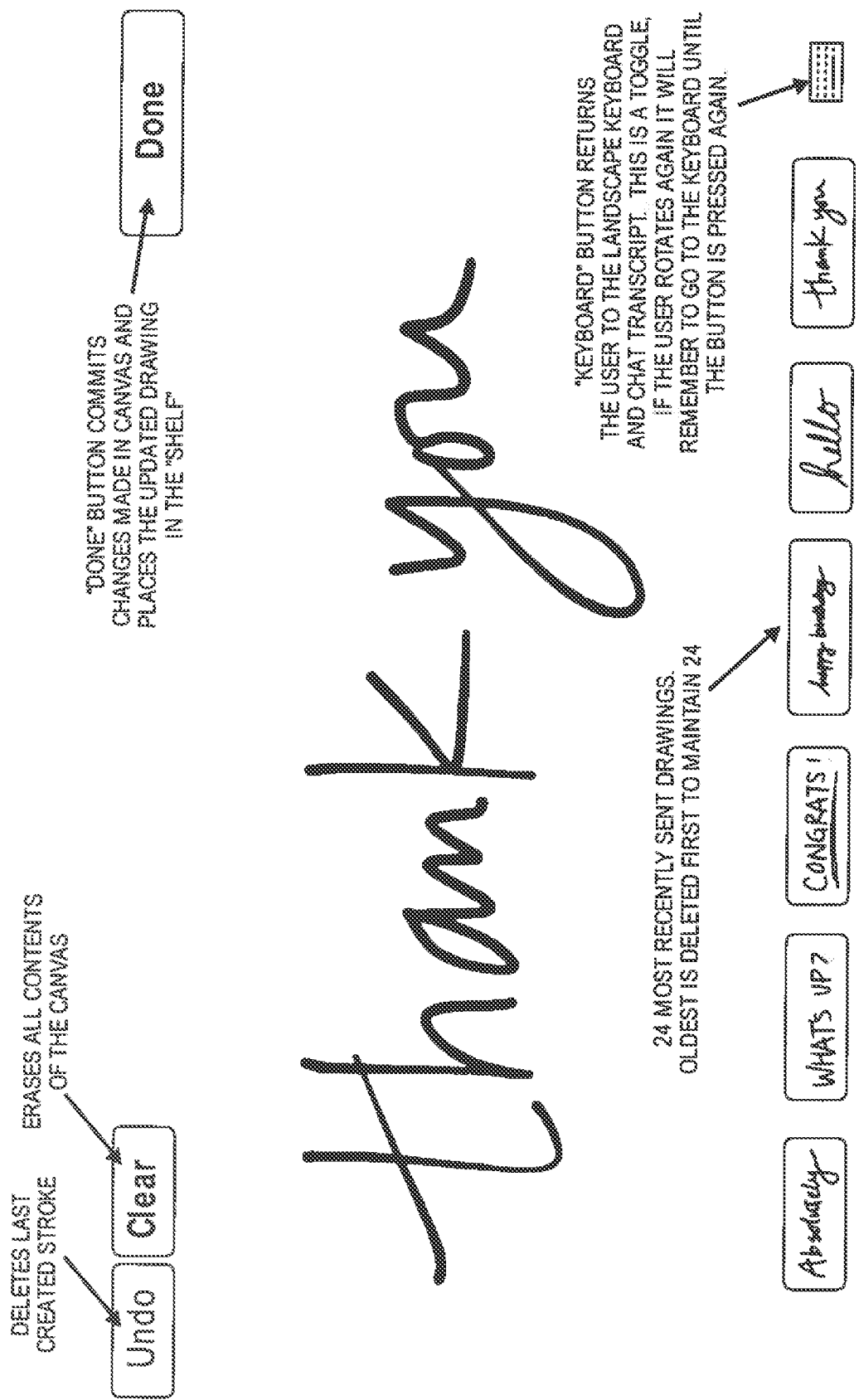
Figure 12B:
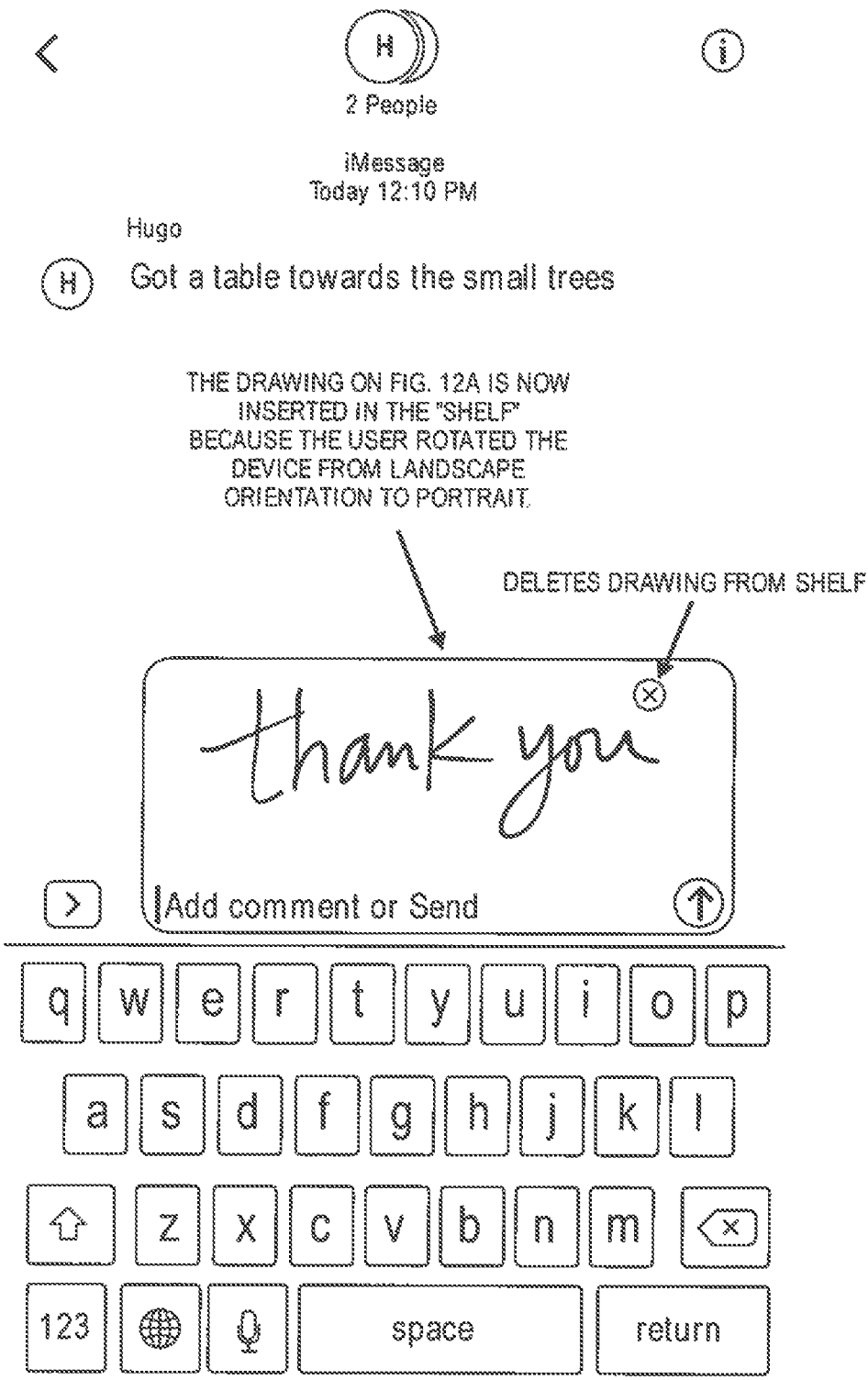
Figure 12C:
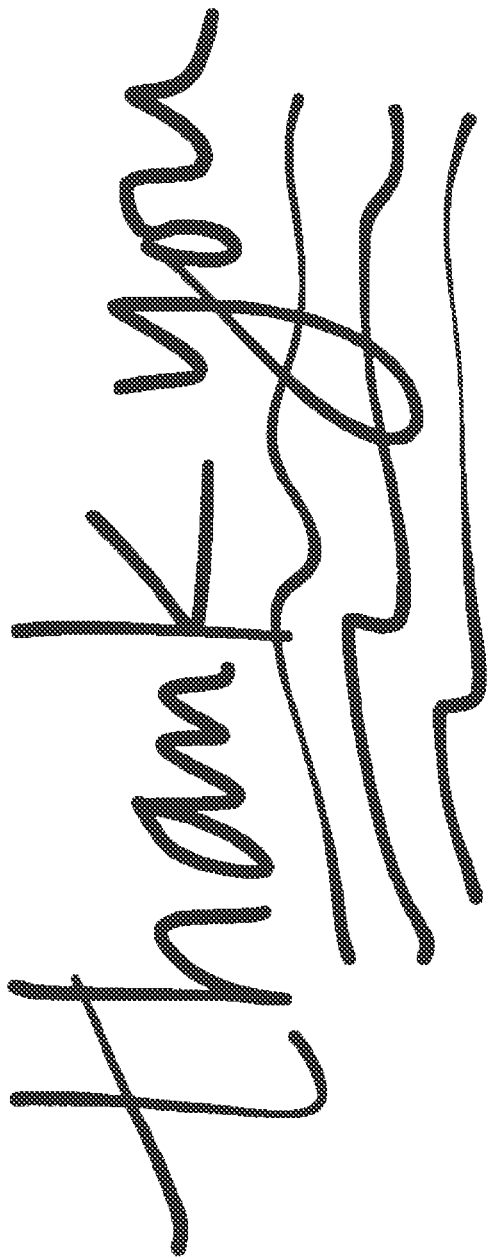

Another aspect of the embodiments described herein relate to how the user interface on the sending device can operate during the process of receiving a handwritten message. In one embodiment, a communication device, such as the communication device 10A can include a messaging app that presents the user interface shown in FIG. 1B. That user interface includes an on-screen keyboard which a user can use to enter text in a conventional manner. In one embodiment, a user can switch from keyboard text entry to handwritten message entry merely by changing the orientation of the communication device. For example, by holding the communication device in a portrait mode shown in FIG. 1B, the user can enter text using the on-screen keyboard; by merely changing the orientation from the portrait orientation to a landscape orientation in one embodiment, the communication device can automatically as a result of the change in orientation switch from keyboard entry mode to handwritten message input mode and can present a handwritten message input canvas in landscape mode on the touchscreen at the communication device. Thus, the switch between text entry mode by on-screen keyboard and handwritten message input mode can occur by merely changing the orientation of the device, such as a change from portrait orientation to landscape orientation. The user does not need to touch an icon to cause this change in input modes but rather does so by merely changing the orientation of the device. The communication device, such as the communication device 10A can include a set of one or more sensors which can be used to detect this change in orientation, such as a set of accelerometers or orientation sensors or gyroscopes or a combination of such sensors. FIGS. 12A and 12C show examples of the handwritten message input canvas shown in landscape mode on the communication device in one embodiment. After entering the handwritten message input mode in which the handwritten message input canvas is displayed in landscape mode, the user can "commit" to the handwritten input by changing the orientation back from landscape orientation to portrait orientation which causes the presentation of the user interface shown in FIG. 12B in which the "shelf" or text staging region shows the handwritten message which was inputted and recorded from the handwritten message input canvas. If the user wants to create further edits to that handwritten message displayed in the "shelf" or the text staging region then the user can change the orientation from the portrait orientation shown in FIG. 12B back to the landscape orientation shown in FIG. 12C to enter further edits to the handwritten message. The user can then "commit" to those edits by changing the orientation again from landscape back to portrait, which change is shown in the transition between FIGS. 12C and 12D. If the user is satisfied with the handwritten message shown in the "shelf", the user can then select the send button (shown as the up arrow) to cause the text message to be sent. In one embodiment, the handwritten message input canvas shown in landscape orientation can include a plurality of controls, such as an undo button or a clear button or a done button as shown in FIG. 12A and can also include a scrollable set of recently sent handwritten messages which can allow a user to select a previously sent handwritten message rather than creating a new one. The user interface which includes the handwritten message input canvas in landscape orientation can also include a keyboard button which can allow the user to return to a landscape keyboard and chat transcript, and this keyboard button can operate as a toggle so that once set landscape orientation will remain based upon the current state of that toggle which is controlled by the keyboard button. Thus the user can in effect disable handwritten message entry by toggling the system into keyboard mode in the landscape orientation.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 13:
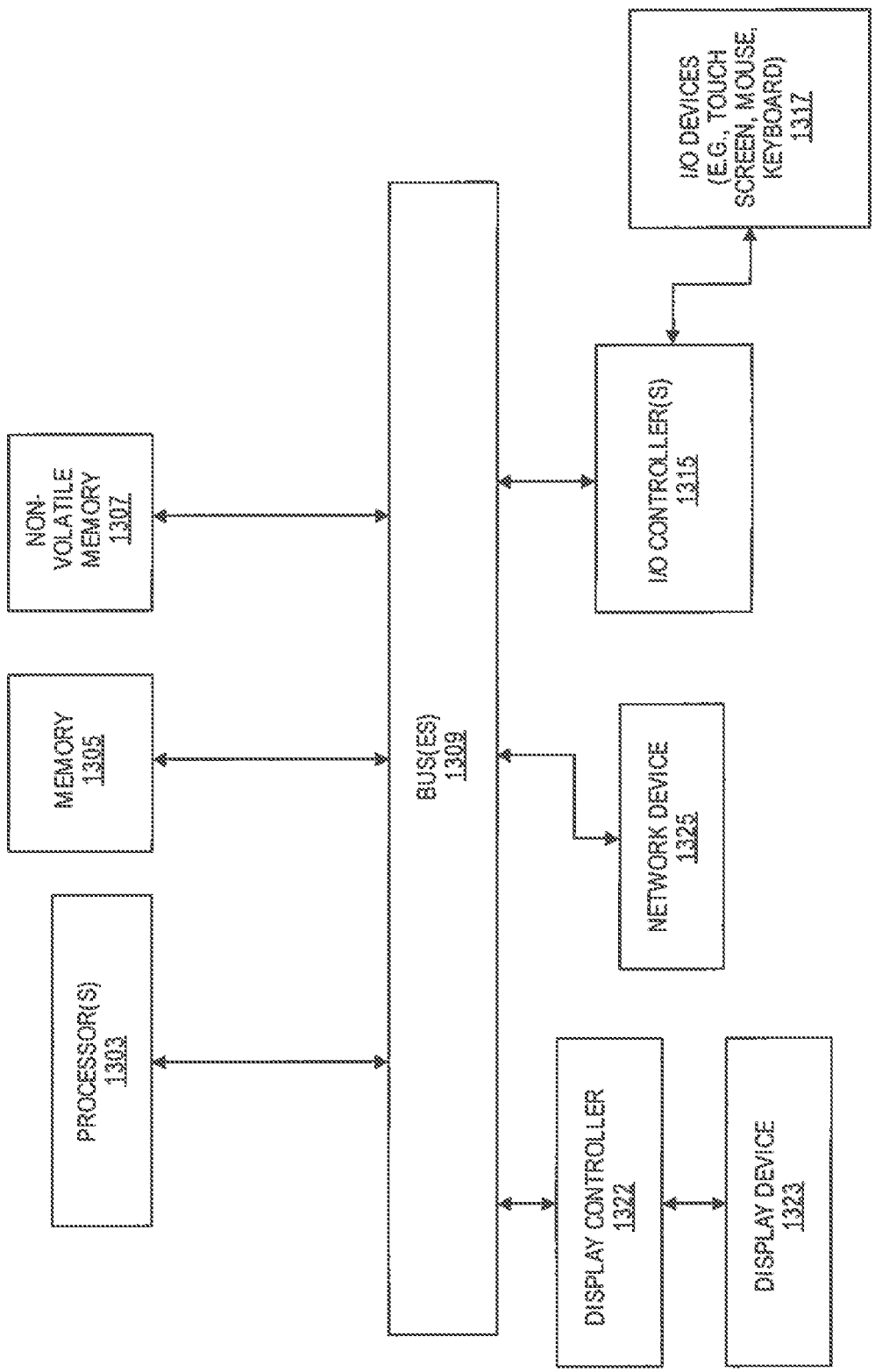
FIG. 13 is a block diagram of a data processing system which can be used with the embodiments described herein.

FIG. 13 is a block diagram of data processing system hardware according to an embodiment. Note that while FIG. 13 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown in FIG. 13 can also be used with the present invention.

As shown in FIG. 13, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 13 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WI-FI, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method for receiving and playing back a handwritten message, the method comprising:
   receiving graphics data representing a handwritten message input by a user, the graphics data specifying a playback over time of the handwritten message;
   processing the graphics data based on a set of rules relating to a sequence of one or more strokes to determine to add modifications to displaying of the playback over time of the handwritten message; and
   displaying, on a display of a receiving device, a playback over time of the handwritten message using both the graphics data and the modifications,
   wherein a first portion of the playback uses the graphics data and temporally matches at least one of a first input velocity corresponding to the input of a first portion of the handwritten message by the user, or a first timing corresponding to the input of the first portion of the handwritten message by the user, and
   wherein a second portion of the playback uses the graphics data with the modifications and is at least partially faster or slower than at least one of a second input velocity corresponding to the input of a second portion of the handwritten message by the user, or a second timing corresponding to the input of the second portion of the handwritten message by the user.

2. The medium as in claim 1 wherein the receiving device receives the graphics data from a sending device which created the graphics data in response to a handwritten input on the sending device and wherein the receiving device performs the processing of the graphics data based on the set of rules and wherein the displaying occurs within a message transcript of a messaging app on the receiving device, and wherein the messaging app is configured to communicate SMS and MMS messages.

3. The medium as in claim 2 wherein the messaging app is configured to communicate messages through at least one messaging server that receives the handwritten message from the sending device.

4. The medium as in claim 3 wherein the graphics data comprises vector graphics data and an input canvas size of the sending device and wherein the input canvas size of the sending device is compared to an output canvas size of the receiving device to derive modifications for playback based on a difference between the input canvas size and the output canvas size.

5. The medium as in claim 4 wherein the set of rules are configured to provide a playback over time that has a particular cadence.

6. The medium as in claim 1 wherein the set of rules define a relationship between a sequence of strokes and corresponding modifications in time and wherein a random variation in the modifications are used.

7. The medium as in claim 1 wherein the modifications comprise changing time values based on a difference in size between a drawing input canvas on a sending device and an output canvas in a message transcript on the receiving device that displays the playback over time of the handwritten message.

8. The medium as in claim 1 wherein the modifications include changing time values based on one or more of:
   (a) a detected dot;
   (b) a space between two consecutive strokes;
   (c) two consecutive strokes that intersect;
   (d) a change in force on an input device;
   (e) a stroke along a curved path; or
   (f) a series on consecutive dots; and
   wherein the modifications constrain a perceived velocity of the handwritten message during playback to less than a maximum velocity and more than a minimum velocity.

9. The medium as in claim 1 wherein the processing of the graphics data is performed at runtime when the handwritten message is displayed or immediately before runtime.

10. The medium of claim 1, wherein the method further comprises:
   displaying an initial portion and then beginning playback of the handwritten message at a period of time before the end of the playback if a recorded length in time of the playback exceeds a predetermined period of time.

11. A data processing system comprising:
   a network interface to receive graphics data representing a handwritten message input by a user;
   a text messaging module coupled to the network interface;
   a memory coupled to the text messaging module, the memory configured to store the graphics data in a form of stroke data, the graphics data specifying a playback over time of the handwritten message;
   a stroke analyzer coupled to the memory to analyze the stroke data;
   a heuristics module coupled to the stroke analyzer, the heuristics module configured to process the graphics data based on a set of rules relating to a sequence of one or more strokes to determine to add modifications to displaying of the playback over time of the handwritten message; and
   a display coupled to the memory and configured to display a playback over time of the handwritten message using both the graphics data and the modifications,
   wherein a first portion of the playback uses part of the graphics data and matches at least one of a first input velocity corresponding to the input of a first portion the handwritten message by the user, or a first timing corresponding to the input of the first portion of the handwritten message by the user, and
   wherein a second portion of the playback uses another part of the graphics data with the modifications and is at least partially faster or slower than at least one of a second input velocity corresponding to the input of a second portion of the handwritten message by the user, or a second timing corresponding to the input of the second portion of the handwritten message by the user.

12. The system as in claim 11 wherein the heuristics module is further configured to process the graphics data based on a size of a display of the data processing system relative to a display of a sending device to determine whether to add modifications to the playback of the handwritten message on the display of the data processing system,
 wherein the system receives the graphics data from the sending device which created the graphics data in response to a handwritten input on the sending device and
 wherein the system performs the processing of the graphics data based on the set of rules and wherein the display of the playback of the handwritten message occurs within a message transcript of a messaging app on the system, and wherein the messaging app is configured to communicate SMS and MMS messages.

13. The system as in claim 12 wherein the graphics data comprises vector graphics data and an input canvas size of the sending device and wherein the input canvas size of the sending device is compared to an output canvas size of the system to derive modifications for playback based on a difference between the input canvas size and the output canvas size.

14. The system as in claim 13 wherein the set of rules define a relationship between a sequence of strokes and corresponding modifications in time and wherein a random variation in the modifications are used.

15. The system as in claim 14 wherein the modifications include changing time values based on one or more of:
 (a) a detected dot;
 (b) a space between two consecutive strokes;
 (c) two consecutive strokes that intersect;
 (d) a change in force on an input device;
 (e) a stroke along a curved path; or
 (f) a series on consecutive dots; and
 wherein the modifications constrain a perceived velocity of the handwritten message during playback to less than a maximum velocity and more than a minimum velocity.

16. A method comprising:
 receiving graphics data representing a handwritten message input by a user, the graphics data specifying a playback over time of the handwritten message;
 processing the graphics data based on a set of rules relating to a sequence of one or more strokes to determine to add modifications to displaying of the playback over time of the handwritten message; and
 displaying, on a display of a receiving device, a playback over time of the handwritten message using both the graphics data and the modifications,
 wherein a first portion of the playback uses the graphics data and matches at least one of a first timing corresponding to the input of a first portion of the handwritten message by the user, or a first input velocity corresponding to the input of the first portion of the handwritten message by the user, and
 wherein a second portion of the playback uses the graphics data with the modifications and is at least partially faster or slower than at least one of a second timing corresponding to the input of a second portion of the handwritten message by the user, or a second input velocity corresponding to the input of the second portion of the handwritten message by the user.

17. The method as in claim 16 wherein the receiving device receives the graphics data from a sending device which created the graphics data in response to a handwritten input on the sending device and wherein the receiving device performs the processing of the graphics data based on the set of rules and wherein the displaying occurs within a message transcript of a messaging app on the receiving device, and wherein the messaging app is configured to communicate SMS and MMS messages.

18. The method as in claim 17 wherein the messaging app is configured to communicate messages through at least one messaging server that receives the handwritten message from the sending device.

* * * * *